Oct. 26, 1943.     E. R. BARRETT     2,332,962
SKIP LOADER AND DUMPER
Filed July 23, 1941     3 Sheets-Sheet 1

INVENTOR
Edward R. Barrett
BY
Harness, Dickey & Pierce
ATTORNEYS

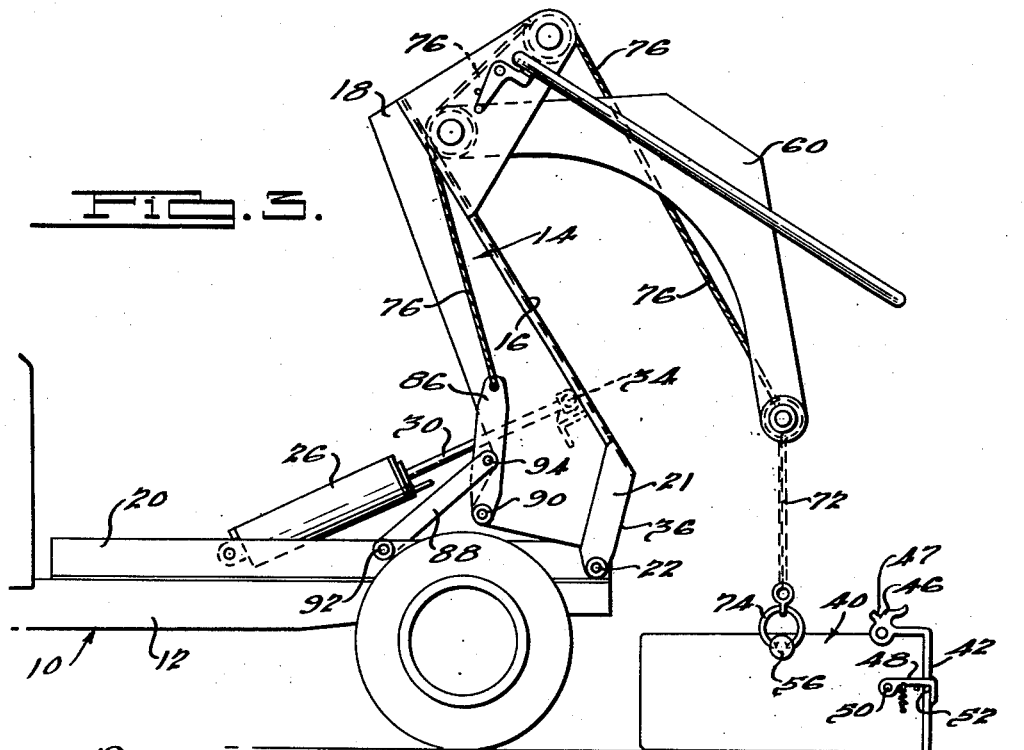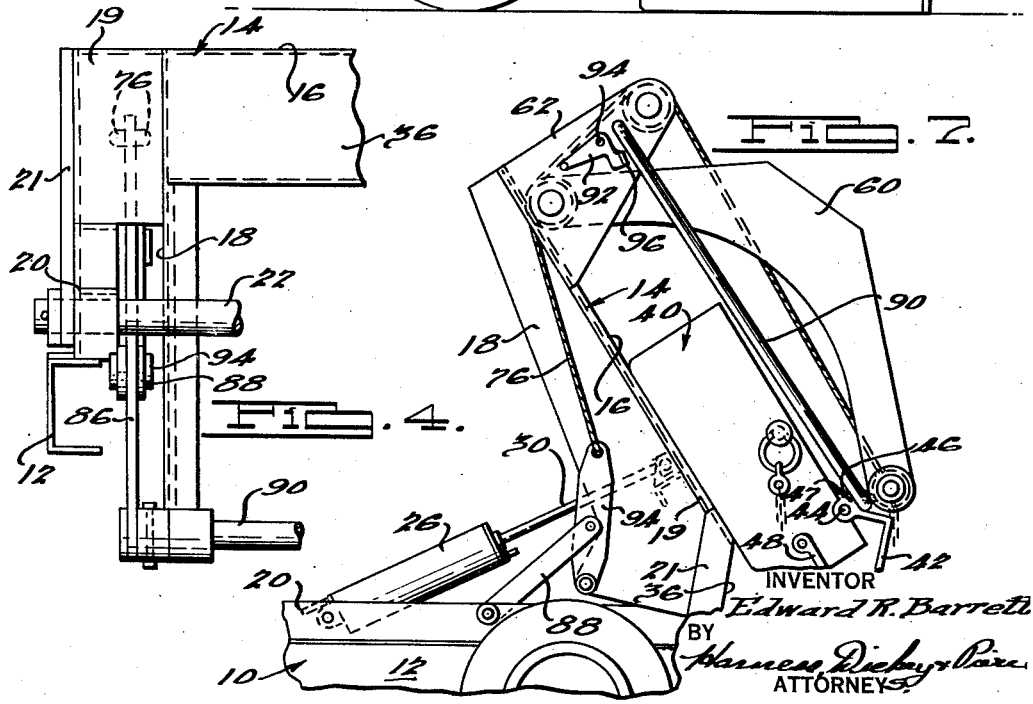

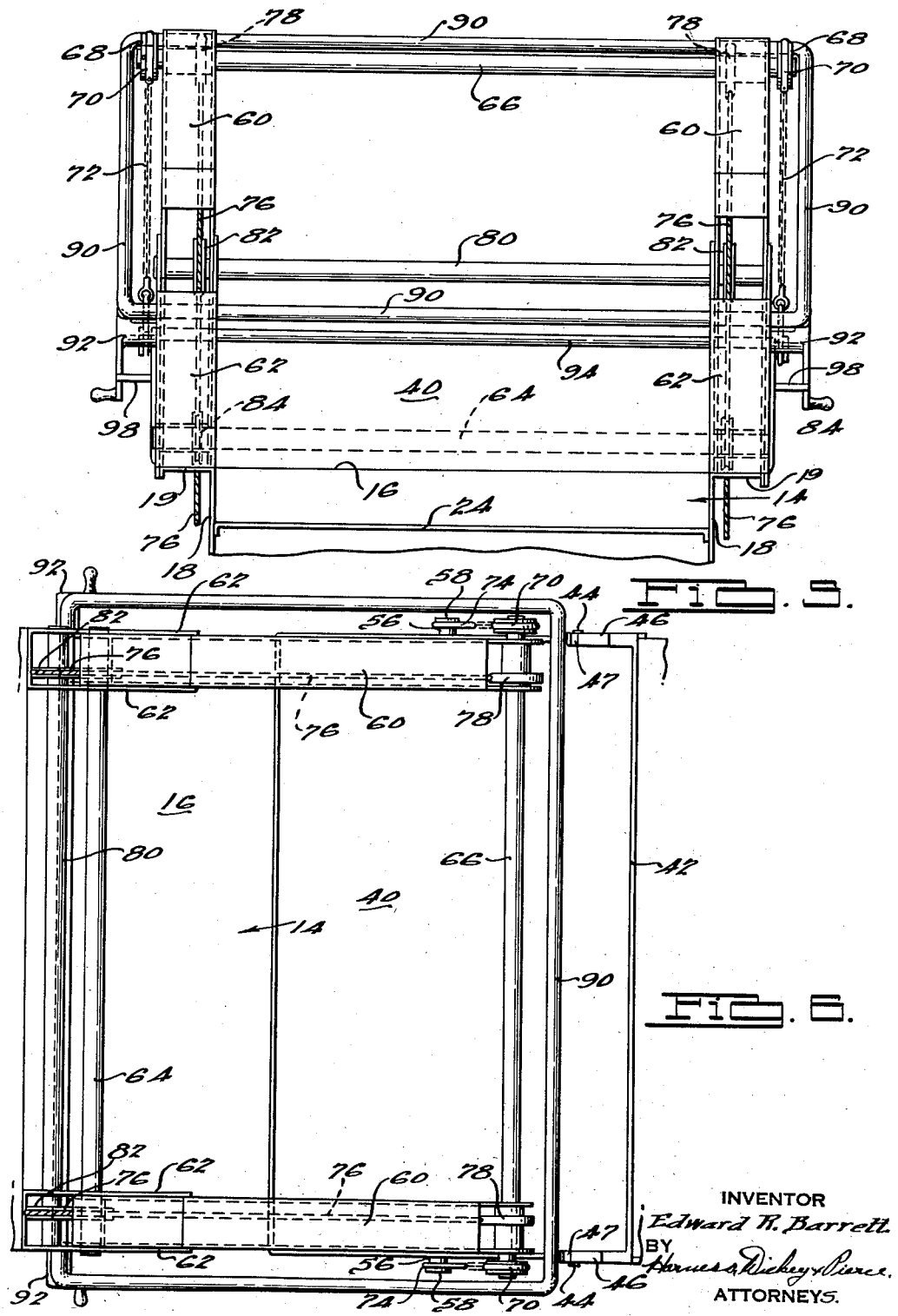

Patented Oct. 26, 1943

2,332,962

UNITED STATES PATENT OFFICE 2,332,962

SKIP LOADER AND DUMPER

Edward R. Barrett, Detroit, Mich., assignor to Gar Wood Industries, Inc., Detroit, Mich., a corporation of Michigan Application July 23, 1941, Serial No. 403,656

8 Claims. (Cl. 214—77)

The present invention relates to improvements in skip loader and dumper constructions.

One of the primary objects of the present invention is to provide a construction whereby a dump truck, that is, a truck having a tilting body, may be utilized as a hoist for handling heavy objects.

A further object of the present invention is to provide an improved construction whereby a skip may be picked up from the ground to an elevated position above the ground and may, if desired, be deposited upon the body of a dump truck and carried thereon.

A further object of the invention is to provide an improved construction in which a tilting dump truck body is so constructed that it may engage a skip, standing on the ground, and position such skip on the dump body as such dump body is lowered to its normal horizontal position.

A further object of the invention is to provide improvements in constructions of the type mentioned whereby skips mounted upon truck bodies may be deposited upon the ground through a simple tilting movement of the dump body.

A further object of the invention is to provide improvements in constructions of the type mentioned whereby the contents of the skip may be dumped through a tilting movement of the dump body while maintaining the skip in position on the dump body.

Other objects of the invention will become apparent from the following specification, the drawings relating thereto and from the claims hereinafter set forth.

In the drawings, in which like numerals are used to designate like parts in the several views throughout:

Fig. 3 is a view similar to Fig. 1, showing the parts in another position and showing the skip on the ground;

Fig. 4 is a fragmentary view taken substantially along the line 4—4 of Fig. 1;

Fig. 5 is an end elevational view taken substantially along the line 5—5 of Fig. 1;

Fig. 6 is a top plan view taken substantially along the line 6—6 of Fig. 1; and

Fig. 7 is a partial side elevational view illustrating another operation of the present invention when the skip is dumped while on the body.

Figure 1:
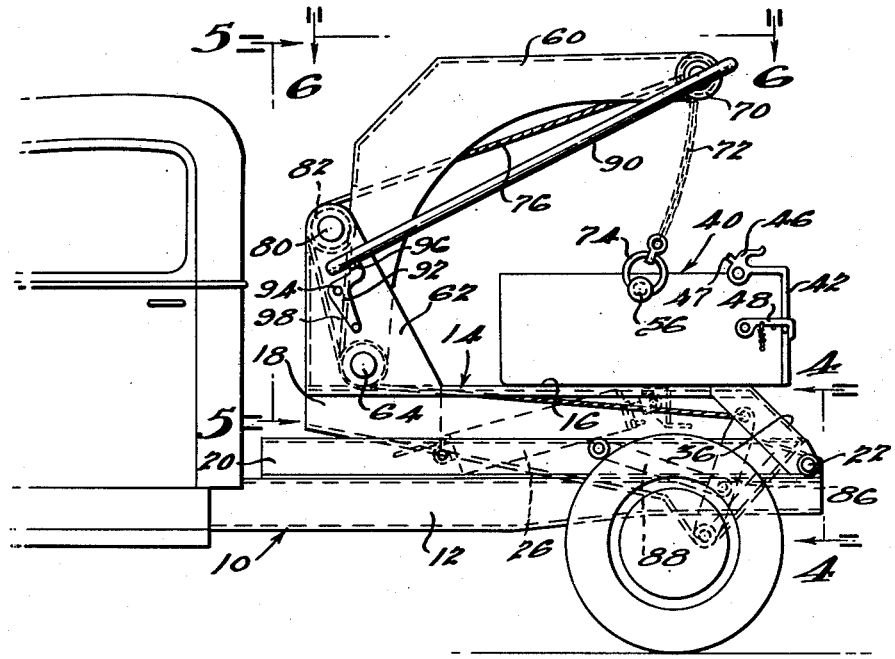
Figure 1 is a partial side elevational view of a vehicle dump truck construction embodying features of the present invention, with the body in its normal horizontal position and showing the skip mounted thereon.

Referring to the drawings, an automotive vehicle is generally indicated at 10 and includes the usual rear chassis frame 12. A dump body generally indicated at 14 is pivotally mounted upon the chassis 12 and such dump body includes a substantially horizontal floor portion 16 and longitudinally extending side members 18 provided with out-turned flanges 19 therealong. The outer edges of such flanges are flanged downwardly for the purpose of strengthening and stiffening the same. Such side members 18 are disposed between the sides of the chassis frame 12. In order to pivotally connect the body to a sub-frame 20, depending bracket plates 21 are fixed to the outer edges of flanges 19 adjacent the rear ends thereof and along portions of flanges 19 which are flush with the rear tapered edge of the floor. An oppositely aligned pivot pin 22 adjacent the rear edge of the chassis 12 and the rear edge of the dump body 14 pivotally connects the plates 21 with said sub-frame 20.

The sub-frame 20 is generally rectangular in shape and is suitably fixed to the chassis 12. The body 14 has one or more transversely extending members 24, which are adapted to rest upon the sub-frame 20 so as to support the dump body in its normal horizontal position.

Hoisting means are provided for tilting the dump body 14 about the pivot 22. Such hoisting means includes an hydraulic jack 26, which is suitably connected to suitable brackets on the sub-frame 20 by means of a pivot pin 28. The hoist 26 extends rearwardly of the truck and the piston rod 30 thereof is pivotally connected to a bracket 32, which is fixed to the underside of the dump body 14, by means of a pivot pin 34.

The body 14 is provided with a tapered rear edge portion 36, which tapers downwardly toward the pivot point 22, substantially flush with the rear edges of plates 21, and which is adapted to be in a substantially vertical position when the body is tilted upwardly, as shown in Fig. 3. Such tapering of the body floor provides for clearance when an object is lifted onto the body as will be more apparent from a later description.

Means are provided, which are associated with the dump body and the truck chassis, for handling a heavy object, such as a skip generally indicated at 40. Such skip 40 is in the form of a rectangular box having a closed bottom and opening upwardly. The rear end of the box is also open, and is adapted to be closed by a pivoted wall or gate 42. Such gate 42 is pivotally connected to the upper edge of the box by a pivot pin 44 through a gooseneck hinge 46. Such hinges 46 are formed with integral, inwardly projecting ears 47 on the front edges thereof which overlie the side edges of the skip, so that when the gate is pivoted, such ears limit the pivotal movement of the gate.

Latches 48 are pivotally connected to the sides of the box 40 by means of pivot pins 50, and are adapted to hook around outwardly projecting pins 52, which are fixed to the side edges of the rear gate 42. Springs 54 may be provided which urge the latches 48 to locking, or down, position to hold the gate closed. It will thus be seen that by releasing the latches 48, the rear gate 42 may pivot about pivot pins 44 in order to dump the contents of the box 40.

The box 40 has outwardly projecting pins 56, provided with enlarged or upset ends 58, fixed to the sides and located adjacent the top edge substantially midway between the front and rear walls of the box. Such pins are adapted to be engaged by hoisting rings in order to raise and lower the skip 40, as will be pointed out in greater detail hereinafter.

In general, in order to engage and raise and lower the skip 40, the foot end of a boom is pivotally mounted upon the tilting body 14 at a point forwardly of the pivot connection 22, and has means at the rear end thereof for engaging the skip. In order to swing the boom in a vertical plane, a line is connected to the rear or head end thereof and is connected to or made fast to a fixed part of the vehicle, namely, the chassis frame so that when the body is tilted upwardly, the heavy object, or the skip, may be attached to the boom; and, when the body is lowered, the heavy object, or skip, will be raised to a position above the ground and may be positioned directly on the body to be carried thereby when the body is in its normally horizontal position.

In detail, such boom includes a pair of side boom members 60, each of which is angular in form. One of the sides of each of such boom members 60 normally extends upwardly in a generally vertical direction, and the other side extends rearwardly in a generally horizontal direction, when the body is in its normally horizontal position, as shown in Figure 1.

In order to mount, or step, the boom members 60 to the body 14, and to provide mountings for other associated operating elements, a pair of upstanding bracket members 62 are fixed to the flange portions 19 of the body 14 adjacent the forward end of such body. A transversely extending pivot shaft 64 extends through suitable bearing openings in the brackets 62 and in the lower or foot ends of the boom members 60, so as to pivotally connect such boom members 60 with respect to the body 14. Such shaft may, of course, be readily removed so that the boom may be removed, if desired. The other, or head, ends of the boom members 60 are connected together by means of a transversely extending shaft 66.

Pulleys 68 are fixed to the outwardly projecting ends of the shaft 66, and are adapted to have pivot rings 70 received in the grooves of the pulleys 68 so that such rings 70 may rotate about the axis of shaft 66 within the grooves. Depending chains 72 are connected to the rings 70, and have other rings 74 connected to the lower ends thereof. Such rings 74 are adapted to be positioned over the projections 56 of the skip 40, inside the enlarged ends thereof, as shown in the various figures, so that the skip may be engaged for raising and lowering.

In order to raise and lower the skip 40 merely by the simple tilting action of the body 14 through actuation of the jack 26, a pair of lines 76, which may be termed luffing lines, is provided in which each of such lines is positioned adjacent one of the booms 60 and its corresponding mounting bracket 62. The upper and rear ends of such lines 76 are connected to rings 78, which are rotatably mounted upon pulleys mounted on the shaft 66 in the same manner that the rings 70 are connected to the pulleys 68, above described.

Another transversely extending pivot shaft 80 is mounted upon the upper ends of the brackets 62 and is adapted to have mounted thereon a pair of pulleys, or sheaves, 82. Such sheaves are located adjacent their corresponding brackets 62, so that they are positioned adjacent the front end of the body. Such lines 76 are adapted to be trained about their respective pulleys 82, and are also adapted to be trained about other pulleys 84 which are mounted upon shaft 64.

The opposite ends of the lines 76 are then trained under the flanges 19 and extend rearwardly of the body, where they are made fast to a fixed part of the vehicle, namely, the sub-frame 20, through links 86 and 88. The ends of the lines 76 are suitably fixed to the upper end of the link 86, the opposite end of which is pivotally connected to a depending portion of its adjacent side 18 by means of a pivot pin 90. The link 88 is pivotally fixed to the sub-frame 20 by means of a pivot pin 92, with the opposite end thereof pivotally fixed to the link 86 intermediate the ends thereof by means of a pivot pin 94.

Figure 2:
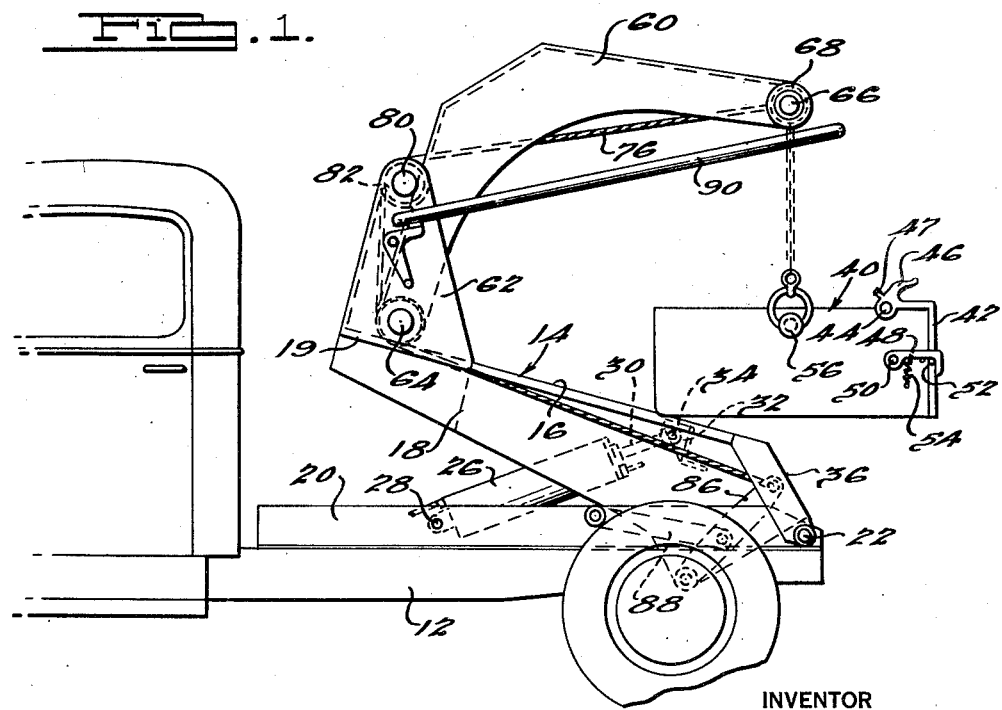
Fig. 2 is a view similar to Fig. 1, showing the body partially elevated.

It will be appreciated that the length of the lines 76 determines the initial angle of the boom. As the body is tilted through the various positions illustrated in Figures 1, 2 and 3, it will be appreciated that the boom 60 is swung in its vertical plane or is luffed through the connection of the lines 76 with the rear, or upper, ends of the boom 60 and through the pulley arrangement and connection of such lines with a fixed portion of the vehicle. As the body is raised, the sheaves 82 and 84 engage or make contact with the bights of the lines 76 so that the boom is swung.

Thus, in the operation of the present device, when the body is tilted to the position shown in Figure 3, the skip 40 may be connected to the boom 60 through the chains 72, as shown. The lines 76 have caused the rear end of the boom to assume the position shown. As the body is lowered to its normal horizontal position, it will be seen that the action of the lines 76, together with the tilting action of the body, will cause the boom 70 to move in a vertical plane, so that skip 40 is raised from the ground. The tapered portion 36 of the body permits the skip to clear the body as the skip is raised. As the lowering of the body continues, the skip 40 is swung forwardly of the body to a position above the floor thereof so that the skip 40 is supported upon the floor 16 of the body. The length of the lines 72 and 76 and the connection of the lines 72 with the chassis through the levers 86 and 88 and the relationship of such levers are such that as the body reaches its horizontal position, the lines 72 are slacked so as to relieve the load on the boom.

The reverse action of that described immediately above will unload the skip from the body and deposit it upon the ground.

According to the present invention, means are also provided so that the skip may be dumped while it is supported upon the body, as shown in Figure 7. In order to accomplish this, a bail frame 90 is provided which is pivotally connected to the upper ends of the mounting brackets 62. Such bail frame is generally rectangular in form, with the sides thereof extending along the outside of the booms 60 and with the rear end thereof extending transversely of the booms 60 rearwardly thereof. Such bail frame 90 is adapted to be held in its upper, or inoperative, position by means of angle lever members 92, which are pivotally mounted upon the upstanding members 62 on the outside thereof by means of pivot pins 94. Such angle members 92 have projections 96 which are adapted to engage the undersides of the bail frame 90 to hold it in its upper position. Removable pins 98 are provided which are adapted to be positioned within suitably located openings formed in the sides of brackets 62, and which are adapted to engage the depending arm of the lever 92 to prevent its pivotal movement and to hold the lever in engagement with the bail frame 90 so as to retain it in its inoperative position.

When it is desired that the frame 90 be allowed to drop to its operative position, it is merely necessary to remove the pins 98 so as to free the levers 92; and the bail frame will then drop downwardly so that it engages within the hook portion of the gooseneck hinge 46, as shown in Figure 7. As the body is tilted upwardly, the skip will slide downwardly toward the rear edge of the body and, by releasing the latches 48, it will be seen that the bail frame 90 will cause the rear gate 42 to pivot about the pivot 44 so that the contents of the skip may be dumped.

What is claimed is:

1. A vehicle of the dumping type and adapted to handle a skip comprising a frame, a body pivotally connected to said frame, a boom having its foot end pivotally connected to said body at a point spaced from the point of pivotal connection between said body and said frame, means connected to said head end and adapted to be connected to said skip, a flexible cable having one end connected to said head end and being trained about a pulley mounted on said body, and means connecting the opposite end of said cable to said frame, said last named means including a linkage having one end pivotally connected to said body with the cable attached to the opposite end thereof, and another linkage having one end pivotally connected to said frame and the opposite end therof pivotally connected to said first named linkage member intermediate the ends of said first named linkage member.

2. A vehicle of the dumping type adapted to handle a skip comprising a frame, a body pivotally connected to said frame, a boom having its foot end pivotally connected to said body at a point spaced from the point of pivotal connection between said body and said frame, means connected to said head end and adapted to be connected to said skip, a flexible cable having one end connected to said head end and being trained about a pulley mounted on said body, means including linkage members fixing the opposite end of said cable to said frame, the construction and arrangement of said cable with respect to said pulley and with respect to its connections with the body and the frame being such that when said body is lowered from its upper to its horizontal position a skip connected to said means will be raised and deposited upon the floor of said body.

3. A skip of generally box form opening upwardly, said skip having one side open, a gate adapted to close said open side, a hooked hinge pivotally connecting said gate to the adjacent walls of said skip the hook of said hinge extending above the top of said box and adapted to be engaged to thereby pivot the hinge and open the gate, and means to limit the pivotal gate opening movement of the hinge.

4. A skip of generally box form opening upwardly, said skip having one side open, a gate adapted to close said open side, a hooked hinge pivotally connecting said gate to the adjacent walls of said skip, the hook of said hinge extending above the top of said box and adapted to be engaged to thereby pivot the hinge and open the gate and latching means for holding said gate in its closed position.

5. A vehicle dump body construction comprising a frame, a body pivotally mounted on said frame and adapted to support a removable receptacle having a pivoted gate and a notched hinge thereon, means for tilting said body, and means mounted on said body adapted to engage the notched hinge of said receptacle when said body is tilted upwardly to hold said receptacle on said body and to open said gate.

6. A vehicle dump body construction comprising a frame, a body pivotally mounted on said frame and adapted to slidably support a removable receptacle having a pivoted gate and a notched hinge, means for tilting said body, and movable means mounted on said body adapted to engage the notched hinge of said receptacle as said receptacle slides on said body when said body is tilted upwardly to hold said receptacle on said body and to open said gate.

7. A vehicle dump body construction comprising a frame, a body pivotally mounted on said frame and adapted to slidably support a removable receptacle having a pivoted gate and a notched hinge, means for tilting said body, a bail frame having one end pivotally mounted on said body and having the other end positioned so that it is adapted to engage the notched hinge of said receptacle when said body is tilted upwardly to thereby hold said receptacle on said body and to open said gate.

8. A skip of generally box form opening upwardly, said skip having one side open, a gate adapted to close said open side, a notched hinge pivotally connecting said gate to the adjacent walls of said skip adjacent the top thereof, said notched hinge being so arranged that the notch thereof extends above the top of the skip and latching means for holding said gate in its closed position.

EDWARD R. BARRETT.